United States Patent [19]

Otto

[11] Patent Number: 4,943,814

[45] Date of Patent: Jul. 24, 1990

[54] COMPUTER CONTROLLABLE MULTI-PURPOSE PLATEN THERMAL PRINTER

[75] Inventor: Neal M. Otto, Woodstock, Conn.

[73] Assignee: Columbia Research and Manufacturing Company, Danielson, Conn.

[21] Appl. No.: 327,560

[22] Filed: Mar. 23, 1989

[51] Int. Cl.$^5$ ........................ G01D 15/10; B41J 11/02

[52] U.S. Cl. ................................ 346/1.1; 346/76 PH; 346/136; 400/58; 400/649; 400/657

[58] Field of Search ................... 346/136, 1.1, 76 PH; 400/58, 470, 649, 657

[56] References Cited

U.S. PATENT DOCUMENTS

| | | | |
|---|---|---|---|
| 2,720,162 | 10/1955 | Currivan | 101/35 |
| 4,332,193 | 6/1982 | Noyes | 101/93.01 |
| 4,547,783 | 10/1985 | Watanabe | 346/76 PH |
| 4,556,333 | 12/1985 | Stefansson | 460/58 |
| 4,560,292 | 12/1985 | Takahashi | 400/59 |
| 4,563,690 | 1/1986 | Tomita et al. | 346/76 PH |
| 4,568,950 | 2/1986 | Ross et al. | 346/76 PH |
| 4,617,577 | 10/1986 | Takahashi et al. | 346/76 PH |
| 4,639,739 | 1/1987 | Tsutsumi | 346/76 PH |
| 4,669,896 | 6/1987 | Yokota et al. | 400/120 |
| 4,734,710 | 3/1988 | Sato et al. | 346/76 PH |
| 4,739,341 | 4/1988 | Matsuno et al. | 346/1.1 |
| 4,746,932 | 5/1988 | Sato | 346/76 PH |

FOREIGN PATENT DOCUMENTS

| | | | |
|---|---|---|---|
| 59-207267 | 11/1984 | Japan | 400/649 |

*Primary Examiner*—Bruce A. Reynolds
*Assistant Examiner*—Gerald E. Preston
*Attorney, Agent, or Firm*—McCormick, Paulding & Huber

[57] ABSTRACT

A method and apparatus for printing information on a web of material utilizing a roller platen located on the opposite side of a web feed path from a printhead. The roller platen has an outer arcuate surface which presses the printing material against the head and draws the material and a printing ribbon past the printhead in a printing operation. The roller platen has flattened surfaces on its circumference that facilitate feeding of the web of material between printing operations.

16 Claims, 4 Drawing Sheets

COMPUTER CONTROLLABLE MULTI-PURPOSE PLATEN THERMAL PRINTER

BACKGROUND OF THE INVENTION

1. Technical Field

The present invention relates to an apparatus and method for printing on a web of material and more particularly to an improvement for printing on the material as the material is advanced relative to a printhead.

2. Description of the Prior Art

A conventional printer requires that a material be advanced in close proximity past a printhead that then prints markings upon that material. Such known printinq systems can use a rotating roller platen in conjunction with driven feed rollers. The roller platen provides a firm surface to maintain the material in a close relationship with the printhead and the driven feed rollers advancing the material past the head. Such systems are generally used in cash registers, label printers and computer output devices.

In such printing systems, it is often desirable to provide an enlarged opening between the printhead and the roller platen to allow free movement of the material when the system is not printing. In the prior art, the enlarged opening was created by moving either the roller platen or the printing head away from the other as illustrated by U.S. Pat. No. 4,617,577 issued Oct. 14, 1986 to Takahashi et al.

Other known art provides an area with diminished radius on the roller platen so that when the area of diminished radius is adjacent to the printhead, the opening is enlarged as illustrated by U.S. Pat. No. 4,556,333 issued Dec. 3, 1985 to Stefansson. In the Stefansson patent the roller is used as an inking drum and operates with a second inked roller to apply ink to a sheet of material. Accordingly, there is no separate ink ribbon since the ink is applied from the surface of the roller platen.

The embodiments in which an enlarged opening is created advance the material past the printhead through the use of driven feed rollers or spools on which the material is wound. A forward roller or spool draws the material past the printing head and a rear roller or spool provides tensioning to prevent slack buildup either by a driving mechanism or other means such as a friction brake.

The mechanisms for advancing the material are necessarily complex since the speeds of the driven feed rollers or spools must be perfectly coordinated with the speed of the roller platen to prevent jamming or smudging of the material due to improper feed rates. Such mechanism is expensive and complex to build and subject to wear and misadjustment which reduce the effectiveness of the printer.

Accordingly, the object of the present invention is to provide an apparatus and method for improved feeding of a web of material within a printer and more particularly, an apparatus and method which combine a simplified means for feeding the material with reduced possibility of that material jamming or smudging along its feed path.

SUMMARY OF THE INVENTION

The present invention resides in a printing apparatus for printing on a web of material. For example, the web of material may be a packaging material being fed through a packaging machine. The printing apparatus includes means defining a feed path along which a web of material is advanced in a printing operation. The material has one side and an opposite side, the one side having a print-receiving surface for receiving printed information. A printhead is mounted at a printing station along the feed path adjacent the one side of the web of material for generating printed information on the print-receiving surface as the material passes along the feed path past the printhead. A roller platen is mounted along the feed path at the printing station and adjacent the opposite side of the web of material and has an axis of rotation extending transversely of the feed path and parallel to the opposite side of the material. The roller platen has at least one arcuate surface spaced from the axis of rotation by a given amount selected to press the print receiving surface of the web of material against the printhead during a printing operation. The roller platen also has another surface adjoining the arcuate surface and spaced more closely to the axis of rotation than the arcuate surface. The other surface provides an opening between the roller platen and the printhead for free movement of the web of material along the feed path when the platen is rotated to position the other surface adjacent the material. A drive means is connected in a driving relationship with the roller platen for rotating the platen about the axis and advancing the web of material past the printhead when the arcuate surface presses the material against the head during a printing operation.

The web of material is thus drawn forward past the printhead during printing by the pressure created as the arcuate surface of the roller platen presses the web against, and rotates by, the printhead. The need for separate mechanisms to move the material away from the printhead between printing operations and to advance the material against the head during printing is thereby eliminated. The present invention also ensures that the roller platen and material move at the same speed during a printing operation.

DETAILED DESCRIPTION OF THE PREFERRED EMBODIMENTS

Figure 1:
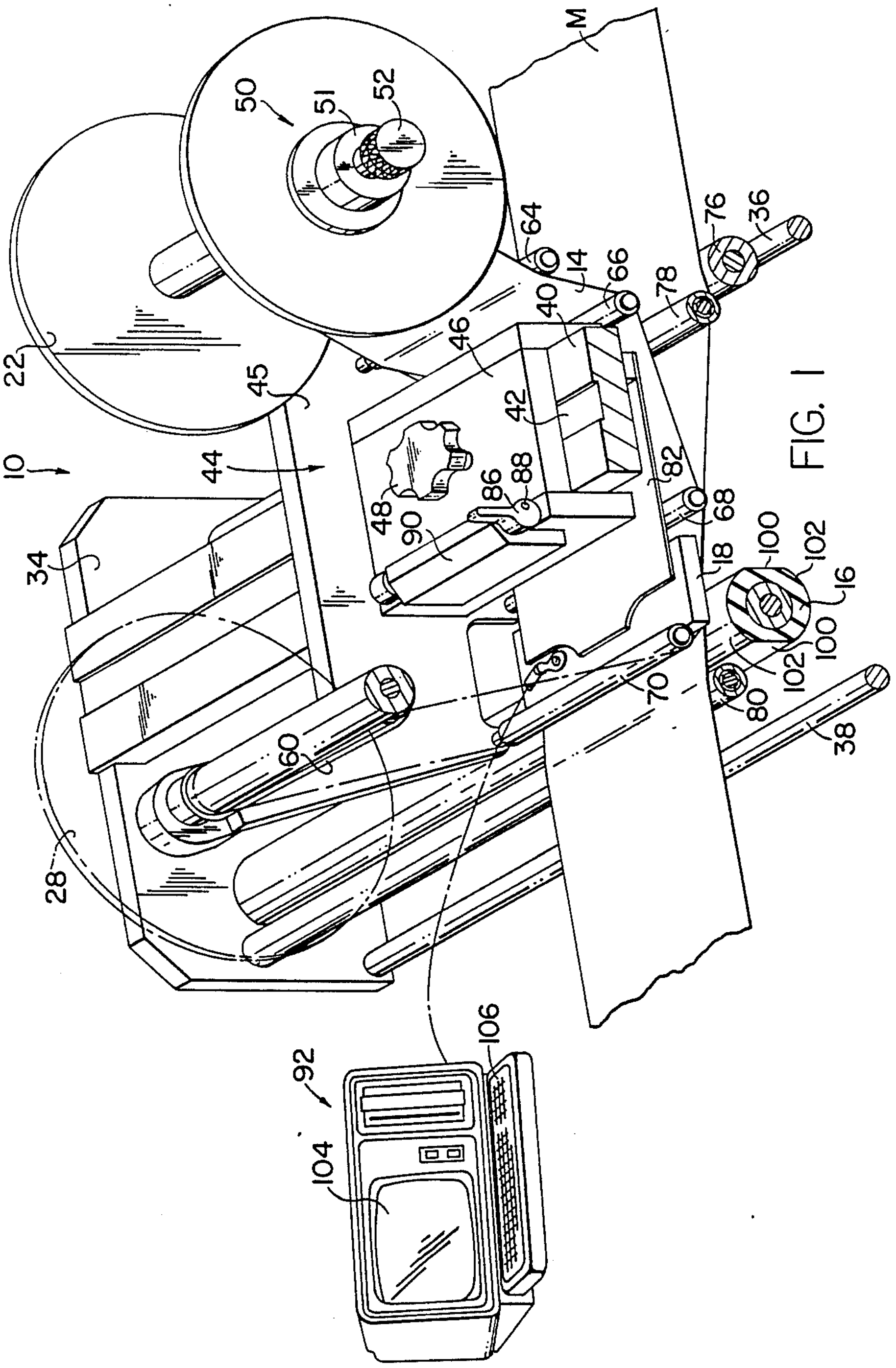
FIG. 1 is a perspective view of a printer in accordance with the invention.

FIG. 1 shows a thermal printer, generally designated 10, in accordance with the invention. The printer 10 could for example, be used in advance of a packaging machine to apply bar codes, date stamps or other marking indicia on material to be used in the packaging operation. As will be shown hereinafter, it is desirable that the printer 10 be controlled by a programmable computer in order that changes in the printed pattern be made in a flexible and rapid manner.

Figure 2:
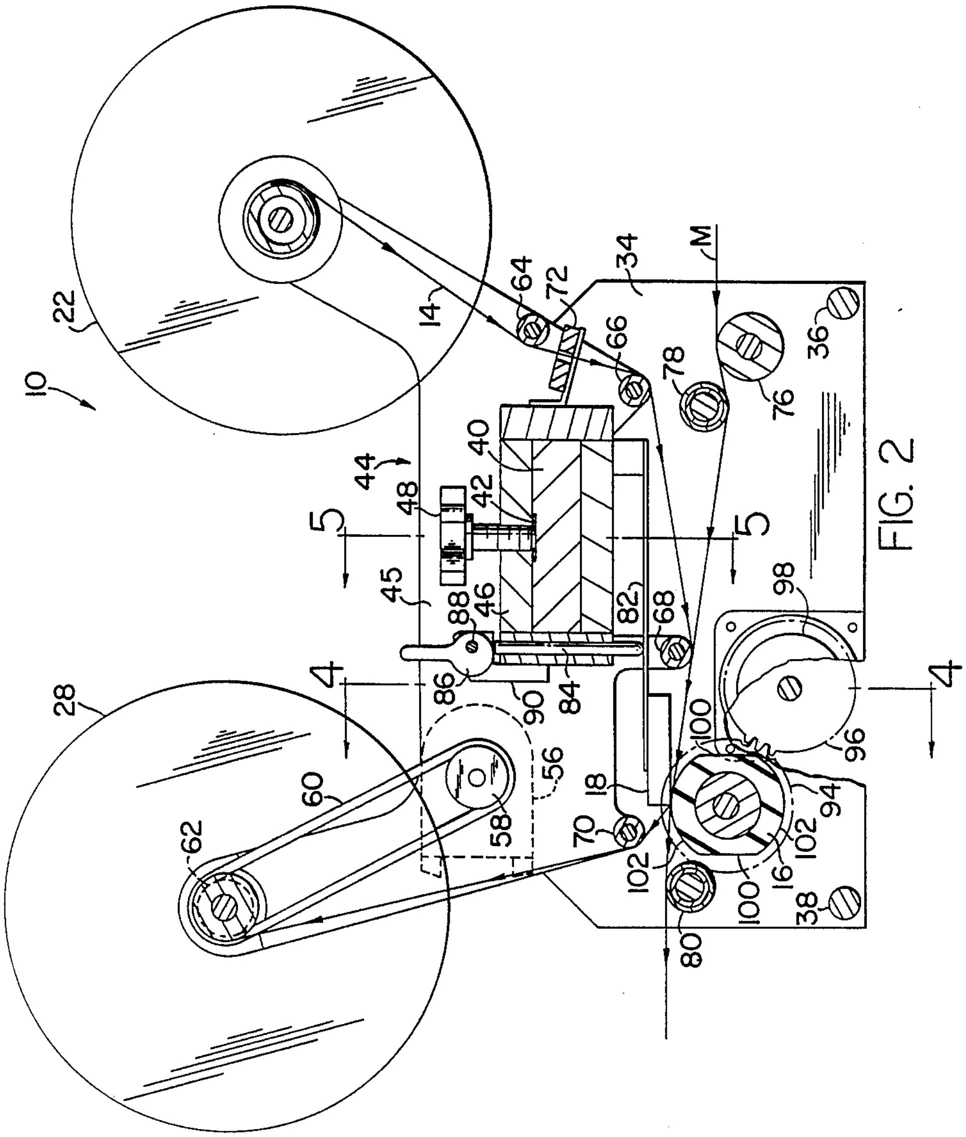
FIG. 2 is a side view of the printer of FIG. 1 showing the feed paths of the web of material and the thermal ribbon.

In FIGS. 1 and 2, a web of material M enters the printer 10 and passes along a feed path past a printhead 18 at the printing station. A thermal ribbon 14 advances along another feed path which coincides with a portion of the feed path for the web of material M in the vicinity of the printhead 18. At the printing station, a rotatable roller platen 16 pressures the material M and the ribbon 14 against the printhead 18 during a printing operation. The web of material M can be but is not limited to, packaging film, paper, cardboard and label-carrying webs. It will also be understood that there are other embodiments of the invention where the material M is thermally sensitive and no thermal ribbon 14 is needed. Additional embodiments are possible where the printing is by a non-thermal means such as for example, electrostatic or dot matrix printers.

In FIG. 2, the thermal transfer ribbon 14, such as that distributed by the Sony Chemicals Corporation bearing a thermally transferable inking material on one side, is delivered from a supply spool 22 and guided along its feed path between the thermal printhead 18 and the rotatable roller platen 16. The ribbon 14 is then wound onto a take-up spool 28.

All of the components of the printer 10 are supported on a stationary base frame composed of a front wall 32 and back wall 34 with two rods 36 and 38 and rectangular guide bar 40 extending between the walls. The roller platen 16 is likewise mounted between the front wall 32 and back wall 34. The guide bar 40 engages a moveable sub-frame 44 and has a channel 42 running lengthwise.

Figure 5:
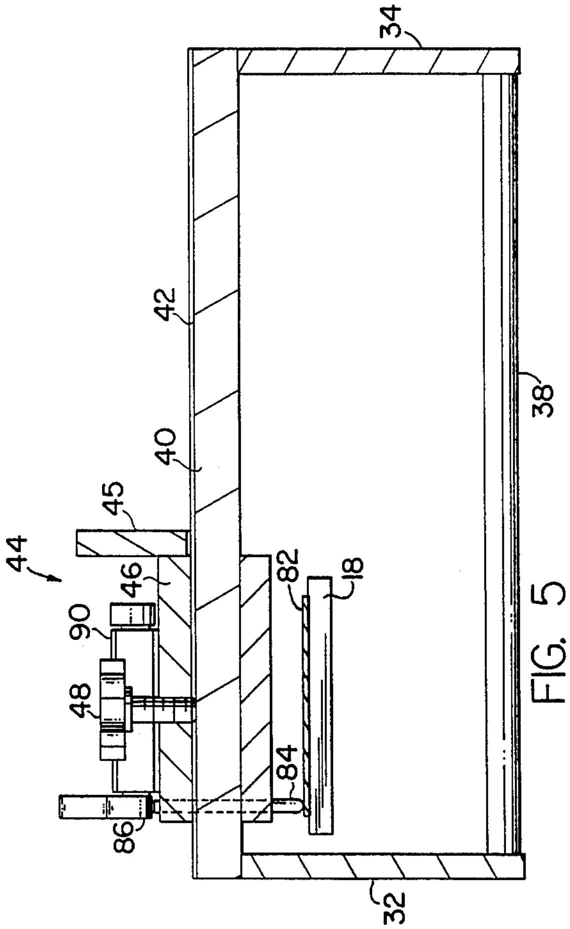
FIG. 5 is another sectional end view of the printer as seen along the sectioning line 5—5 in FIG. 2 and shows the mounting of the moveable frame.

The take-up and supply spools 22 and 28 and guide elements for the thermal transfer ribbon 14 as well as the printhead 18 are all mounted to the separate sub-frame 44. The total ribbon feed path between the supply spool 22 and the take-up spool 28 is defined by guiding rollers 64, 66, 68 and 70 as well as a slotted guide 72, all of which are mounted to the moveable sub-frame 44. The moveable sub-frame 44 consists of a plate 45 and a rectangular sleeve 46 slidably mounted on the rectangular guide bar 40. The moveable sub-frame 44 can be manually slid on the guide bar 40 back and forth transverse to the material as can be seen most clearly in FIG. 5. This movement of the sub-frame 44 allows the printhead 18 and ribbon 14 to print at different lateral locations on the material M which is desirable when the material width is greater than the width of the printhead. The moveable sub-frame 44 is held in a desired transverse position for a printing operation by means of a manually operated clamping screw 48 having a handle on one end. The screw 48 extends through a correspondingly threaded hole in the upper portion of the sleeve 46 and into the channel 42. Tightening or loosening the screw 48 will respectively prevent or allow movement of the sub-frame 44.

Figure 3:
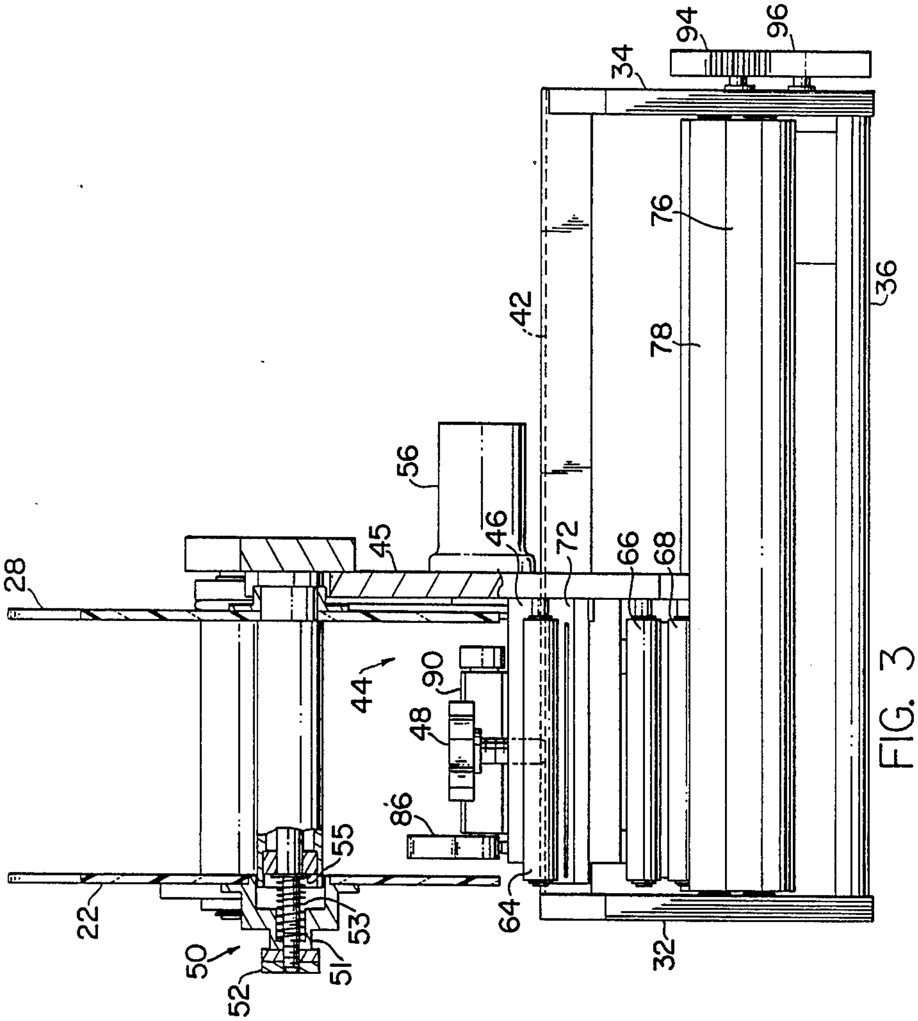
FIG. 3 is an end view of the printer of FIG. 2 showing the thermal ribbon spools and head mounted on a moveable frame.

The ribbon supply spool 22 in FIG. 3 has a friction brake 50 to maintain tension in the transfer ribbon along its feed path before the ribbon passe between the printhead 18 and the roller platen 16. In one embodiment as best seen in FIG. 3, an inner nut 51 is threaded on the rotatable shaft of the spool 22. The inner nut 51 has a recess to contain one end of a spring 53, the other end of the spring pressing against a washer 55 which in turn presses the hub against the sub-frame 44. The force by which washer 55 presses against the hub of the spool 22 controls the amount of force needed to rotate the spool 22. The amount of force the spring 53 exerts against the washer 55 and hence the hub of the spool 22 is controlled by turning the inner nut 51. To prevent loosening of the inner nut 51, a knurled outer nut 52 is also threaded on the shaft of the spool 22. When the tension in the spool has been set using the inner nut 51, the outer nut 52 is tightened against the inner nut thus preventing loosening of the inner nut. The friction brake 50 does not allow the supply spool 22 to rotate until a force determined by the inner nut 51 has been exerted in the forward direction upon the ribbon 14. As a result, the ribbon 14 is maintained in a state of tension during advancement and slack is prevented from forming.

Figure 4:
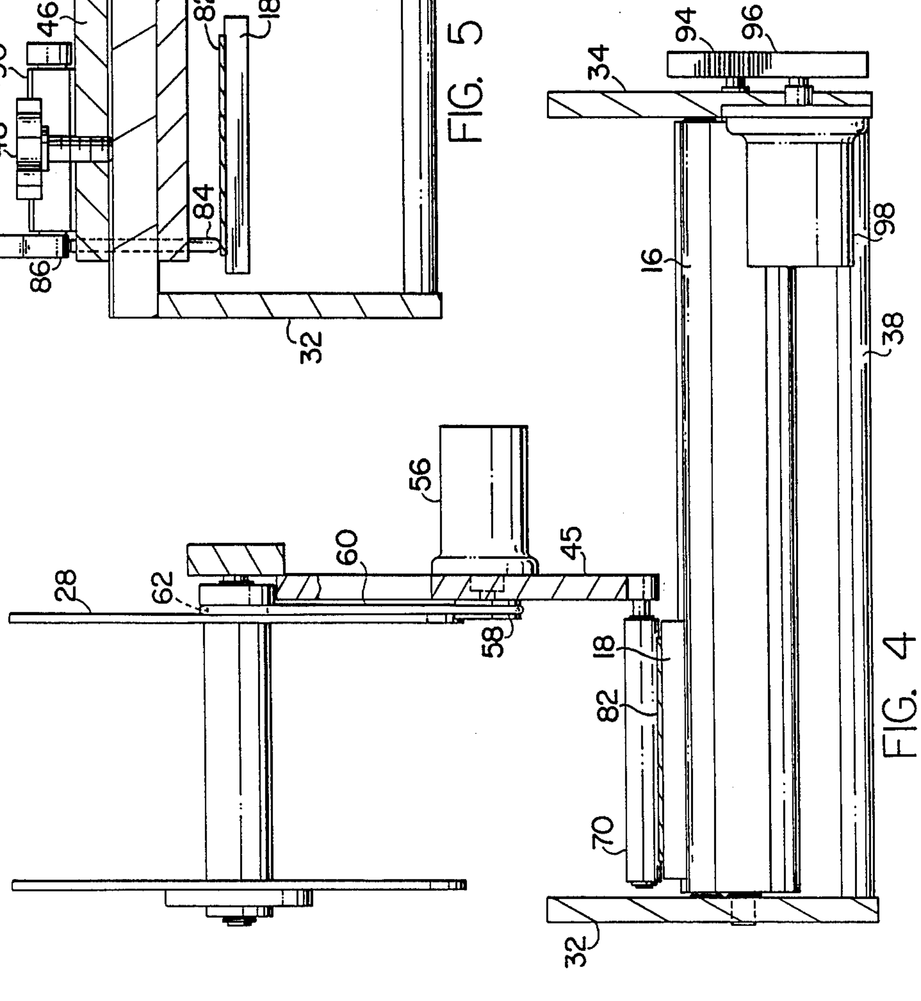
FIG. 4 is a sectional end view of the printer as seen along the sectioning line 4—4 in FIG. 2.

The take-up spool 28 in FIG. 2 is coupled to a drive source 56 which can be D.C. motor and, as shown most clearly in FIG. 4, has a pulley 58 connected by a smooth belt 60 to a groove 62 provided in the shaft of the take-up spool 28. When the drive source 56 is activated at the beginning of a print operation, the belt 60 drives the groove 62 and thereby the take-up spool 28 at a speed sufficient to wind up the ribbon 14 after it has passed by the printhead 18. In the preferred embodiment, the belt 60 will slip on the pulley 58 and groove 62 before the take-up spool 28 can exert enough force to overcome the friction brake 50 and advance the ribbon 14. In this manner it is possible to allow the drive source 56 to run continuously with advancement of the ribbon 14 occurring only when the roller platen 16 is advancing the web of material M and the ribbon forward.

The web of packaging material M to be printed on enters the printer 10 between two guiding rollers 76 and 78 that are mounted between the front wall 32 and the back wall 34. The packaging material M then passes under the roller 68 and between the roller platen 16 and the ribbon 14 with the surface to be printed on facing the surface of the ribbon 14 hearing the thermally transferable material. An additional guiding roller 80 is also provided to guide the packaging material M as it is stripped away from the ribbon 14 and exits the printer 10.

In the preferred embodiment it is desirable to adjust the position of the printhead 18 relative to the roller platen 16 in order to set the printing pressure and accommodate platens of different diameters. For adjustment of the head, the printhead 18 is mounted to the moveable sub-frame 44 by a resilient mounting plate 82, and a plunger 84 is pressed against the mounting plate by a cam lobe 86 having a small lever for ease of adjustment. The cam lobe 86 is mounted by means of a rotatable, frictionally restrained shaft 88 to a housing 90. To depress the printhead 18, the cam lobe 86 is rotated so that the lobe pushes down on the plunger 84 and forces the plate 82 and hence the printhead 18 downward.

For thermal printing, the printhead 18 is a thermal type, such as the Gulton SM-Series Thermal Printhead that consists of a linear array of individually actuated heating elements. As can be seen most clearly in FIG. 1, the array of heating elements is arranged transversely to the feed path of the thermal ribbon 14 and the packaging material M. As the thermal ribbon 14 and the packaging material M are moved past the printhead 18, the individual heating elements are actuated in a sequence determined by a microprocessor-based control system 92 for the printer 10. The heat caused by the actuation of an individual heating element causes the thermally transferable material on the ribbon 14 to transfer to the packaging material M. By appropriate control of the heating elements, a desired pattern is generated on the moving packaging material M in the course of a printing operation.

In FIG. 2 the roller platen 16 is mounted along the feed path at the printing station opposite the printhead 18, and in one embodiment consists of a hardened rubber sleeve around a steel shaft. The roller platen 16 is connected co-axially to a toothed gear 94 which engages another like gear 96. The gear 96 is attached to a drive source 98 that for example, could be a D.C. motor. The drive source 98 is activated and deactivated at the start and finish respectively of a printing operation by the control system 92. In the preferred embodiment, the outer surface of the roller platen 16 is comprised of one or more flattened surfaces 100 connected by one or more arcuate surfaces 102. However it will be understood that in other embodiments of this invention areas of diminished radii may be employed in place of the flattened surfaces. In either case, the flattened surface 100 or the area of diminished radius lies closer to the axis of rotation of the roller platen 16 than the arcuate surface 102.

For printing, the height of the printhead 18 is set relative to the roller platen 16 by the cam lobe 86 to press the package material M and the thermal ribbon 14 between the arcuate surfaces 102 of the roller platen and the array of heating elements on the head and to establish a gap between the flat surface 100 of the platen and the printhead. Thus, as the arcuate surface 102 is rotated past the printhead 18 during a printing operation, the pressure exerted by the platen 16 against the head 18 presses the material M and ribbon 14 against the heating elements for printing. The pressure also simultaneously draws the thermal ribbon 14 and the packaging material M past the head 18 at the exact speed and in the same direction of rotation as the roller platen 16. This allows advancement of thermal ribbon 14 and packaging material M without any drive means other than the roller platen 16 and ensures synchronization of the material and ribbon movement with the timed actuation of the heating elements. In addition, the ribbon 14 advances only during a printing operation and so is advanced only as needed.

Correspondingly, when the flattened surface 100 is rotated and possibly stopped adjacent to the printhead 18, a gap is formed which allows for free movement of the web of packaging material between the printhead 18 and the roller platen 16. This gap allows free movement of the material M between printing operations to bring another part of the web to be printed on into position for the subsequent printing operation.

The control system 92 with microprocessor is used advantageously in conjunction with a personal computer having a display monitor 104 and a keyboard 106. Information concerning print format is entered into the computer via the keyboard 106. A number of the parameters concerning print format may include, but is not limited to, the print size and the data defining the printed information. The data necessary for printing is then formatted and made available to the microprocessor.

The microprocessor has several inputs and outputs. The outputs control the operation of the roller platen 16 and the take-up spool 28 through activation and deactivation of the drive sources 98 and 56, and in addition activate the individual heating elements of the printhead 18 to produce a printing pattern in accordance with the formatted data. The inputs can consist of an external signal source to notify the microprocessor when a printing operation should commence and feedback identifying the position of the roller platen 16.

Each print operation can be commenced independently by the printer 10 or when the control system 92 receives a timing signal from another source such as a web mark reader or an associated packaging machine. The control system 92 simultaneously activates the drive source 56 and 98 to start rotation of the take-up spool 28 and the roller platen 16. When the arcuate surface 102 starts to rotate past the printhead 18, the resulting pressure pulls forward both the packaging material M and the thermal ribbon 14 as the pressure developed overcomes the resistance created by the friction brake 50. When the control system 92 determines that printing of a pattern should begin, the system actuates the individual heating elements of the printhead 18 and produces the desired pattern as the packaging material M passes by. When the printing operation is complete, the control system 92 deactivates both the drive sources 56 and 98 and thereby stops the rotation of both the take-up spool 28 and the roller platen 16. The advancement of the ribbon 14 and packaging material M is thus accomplished solely by the pressure exerted against the printhead 18 by the roller platen 16.

Figure 6:
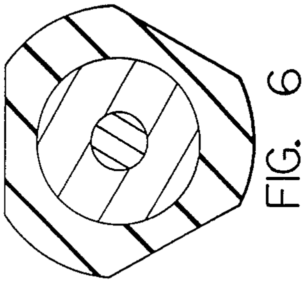
FIG. 6 shows another embodiment of the roller platen in the printer of FIG. 1.
Figure 7:
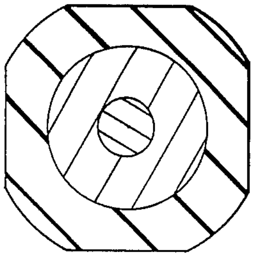
FIG. 7 shows still another embodiment of the roller platen in the printer of FIG. 1.

The length of the arcuate surfaces 102 determines the maximum length that can be printed in one operation since printing will only occur when the arcuate surface 102 is being rotated past the printhead 18. For example: a 2″ diameter roller platen with one flat is capable of printing an area up to 6.824″ long minus the length of circumference removed by the flat. The same diameter roller platen with two flats is capable of printing an area of up to 3.142″ long minus the length of circumference removed by the flats. With four flats, the same diameter roller platen is capable of printing an area up to 1.571″ long minus the length of circumference removed by the flats. Various embodiments of the roller platen 16 are illustrated in FIGS. 6 and 7.

In the preferred embodiment of the invention when the printer 10 is first turned on, the control system 92 activates the drive source 98 for a certain period of time to rotate the roller platen 16 until a flattened surface 100 is adjacent to the printhead 18. By so doing, a gap between the roller platen 16 and printhead 18 is created as previously disclosed and the printer 10 is then ready to accept a supply of either packaging material M or thermal ribbon 14 without any need for moving these elements apart to create the same gap. Means to measure the angular position of the roller platen 16 to accomplish the above could be electrical position encoders, optical sensors or other such devices mounted to the roller platen 16 and either the front or back walls 32 or 34 and connected to the control system 92.

It is to be understood that the invention is not limited to the illustrations described and shown herein, which are merely illustrative of the best modes of carrying out the invention, and which are susceptible of modification in form, size, arrangement of parts and details of operation. The invention rather is intended to encompass all such modifications which are within its spirit and scope as defined by the claims.

I claim:

1. A printing apparatus for printing on a web of material comprising:

means defining a feed path along which the web of material is advanced in a printing operation, the material having one side and an opposite side;

a printhead mounted at a printing station along the feed path adjacent said one side of the web of material for generating printed information on a surface of the web as the web of material passes along the feed path past the printhead;

a roller platen mounted along the feed path at the printing station and adjacent said opposite side of the web of material and having an axis of rotation extending transversely of the feed path and parallel to said opposite side of the material, the roller platen having at least one outer arcuate surface spaced from the axis of rotation by a given amount selected to press said one side of the web of material under pressure against the printhead during a printing operation, the roller platen also having another outer surface located closer to the axis of rotation than the arcuate surface to provide a gap between the roller platen and the printhead for free movement of the web of material along the feed path when the platen is rotated to position said other surface adjacent the material; and drive means connected in driving relationship with the roller platen for rotating the platen about the axis and serving as the controlling driver for advancing the web of material past the printhead when the arcuate surface presses the material under pressure against the head during a printing operation.

2. A printing apparatus for printing information on a web of material as defined in claim 1 further including means defining a feed path for a printing ribbon, a portion of the feed path for the ribbon extending along the feed path for the web of material at the printing station and being interposed between the printhead and the feed path for the material, whereby a printing ribbon and the web of material can be pressed against the printhead by the arcuate surface of the roller platen during a printing operation.

3. A printing apparatus as defined in claim 2 wherein the feed path defining means for the printing ribbon includes a ribbon supply at one end of the feed path, a ribbon take-up spool at the opposite end of the feed path and means for maintaining ribbon tension in the portion of the feed path between the printhead and the take-up spool.

4. A printing apparatus as defined in claim 1 wherein the printhead comprises a thermal printhead.

5. A printhead as defined in claim 1 wherein the printhead comprises a plurality of individually actuated heating elements arranged along the head in a direction generally transverse to the feed path for the web of material.

6. A printhead as defined in claim 5 further including means defining a feed path for a thermal printing ribbon, the feed path for the ribbon extending past the printing station and being interposed between the feed path for the web of material and the individually actuated heating elements of the printhead.

7. A printing apparatus as defined in claim 1 wherein the printhead is fixedly mounted relative to the feed path for the web of material at the printing station.

8. A printing apparatus as defined in claim 1 wherein the surface on the roller platen adjoining the arcuate surface is a flat surface on the exterior of the platen.

9. A printing apparatus as defined in claim 1 further including:

means defining a first frame to which the roller platen and the means defining a feed path for the web of material are mounted, and means defining a second frame to which the printhead is mounted, said second frame means being moveably mounted to said first frame means so that the printhead is moveable in a direction transverse to said feed path for the web of material.

10. A printing apparatus as defined in claim 9 wherein said second frame further includes means defining a feed path for a printing ribbon, a portion of the feed path for the ribbon extending along the feed path for the web of material at the printing station and being interposed between the printhead and the feed path for the material, whereby a printing ribbon and the web of material can be pressed against the printhead by the arcuate surface of the roller platen during a printing operation.

11. A printing apparatus as defined in claim 1 further including an adjustable mounting means for fixing the distance between the printhead and the axis of rotation of the roller platen.

12. A method of printing information on a web of material comprising the steps of:

feeding a web of material along a feed path extending adjacent a printhead at a printing station;

positioning a roller platen at the printing station on the side of the web of material opposite from the printing head and with the axis of the platen extending generally transverse to the feed path for the material and at a given distance from the head, the roller platen having an arcuate surface which presses the web of material under pressure against the head and another surface located closer to the roller platen axis to establish a gap between the platen and the printing head for freely advancing the material past the head;

rotating the roller platen a first amount to cause the arcuate surface to press the web of material against the printhead under pressure and simultaneously control the advance of the material past the head during a printing operation; and rotating the roller platen a further amount to cause the other surface of the platen to establish the gap between the platen and the printing head whereby the web of material can be advanced along the feed path without pressing the material against the printhead.

13. A method of printing on a web of material as defined in claim 12 including the additional step of positioning a printing ribbon between the printing head and the material while the arcuate surface of the roller platen is pressing the material against the printhead.

14. A method of printing as defined in claim 13 wherein the printhead is a thermal printhead and the printing ribbon is a thermal transfer ribbon.

15. A method of printing on a web of material as defined in claim 12 wherein the steps of rotating the roller platen are performed sequentially, and an additional step comprises stopping the roller platen during the period in which the gap is established to allow the web of material to be advanced past the printhead.

16. A thermal transfer printing apparatus for printing on a web of material comprising:

means defining a feed path along which a web of material is advanced in a printing operation, the material having one side and an opposite side, the one side having a print-receiving surface for receiving printed information;

a thermal printhead having a plurality of individually actuated heating elements arranged on the head in a direction generally transverse to the feed path for the web of material;

means defining a feed path for a thermal printing ribbon, a portion of the feed path for the ribbon extending past the printing station and being interposed between the feed path for the web of material and the individually actuated heating elements of the print head, a roller platen mounted along the feed path at the printing station and adjacent said opposite side of the web of material and having an axis of rotation extending transversely of the feed path and parallel to the web of material, the roller platen having at least one arcuate surface spaced from the axis of rotation by a given amount selected to press said print-receiving surface of the material and the thermal printing ribbon under pressure against the printhead during a printing operation, the roller platen also having another surface adjoining the arcuate surface and spaced more closely to the axis of rotation than the arcuate surface to provide a gap between the roller platen and the printhead for free movement of the web of material along the feed path when the roller is rotated to position said other surface adjacent the material; and drive means connected in driving relationship with the roller platen for rotating the platen about the axis and controlling the advancing of the web of material and the thermal ribbon past the printhead when the arcuate surface presses the material and the ribbon under pressure against the head during a printing operation.

* * * * *